March 16, 1926.
D. J. AJOUELO ET AL
ICE CREAM AND CONE VENDING MACHINE
Original Filed Feb. 11, 1922    4 Sheets-Sheet 2
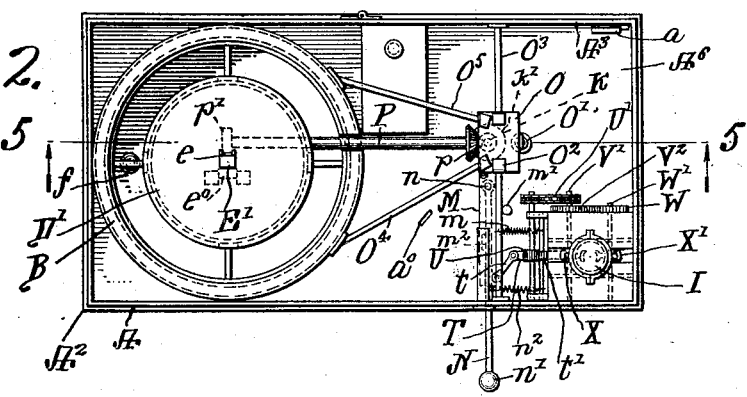
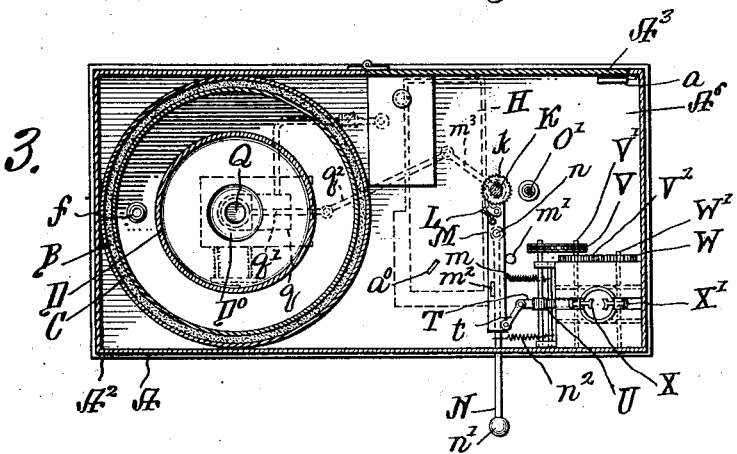
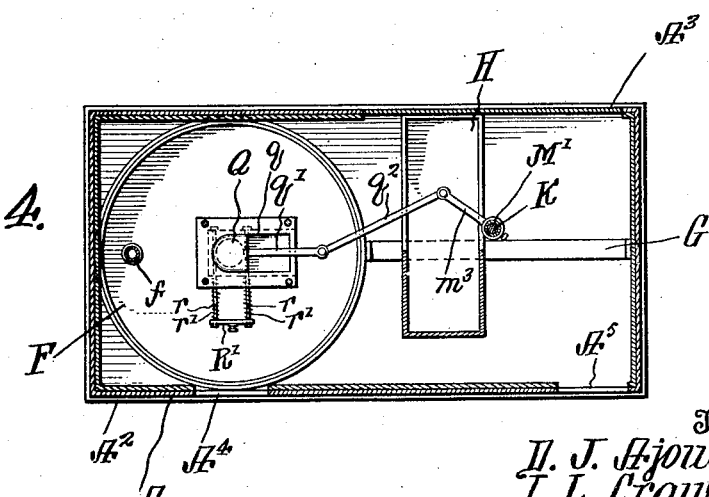

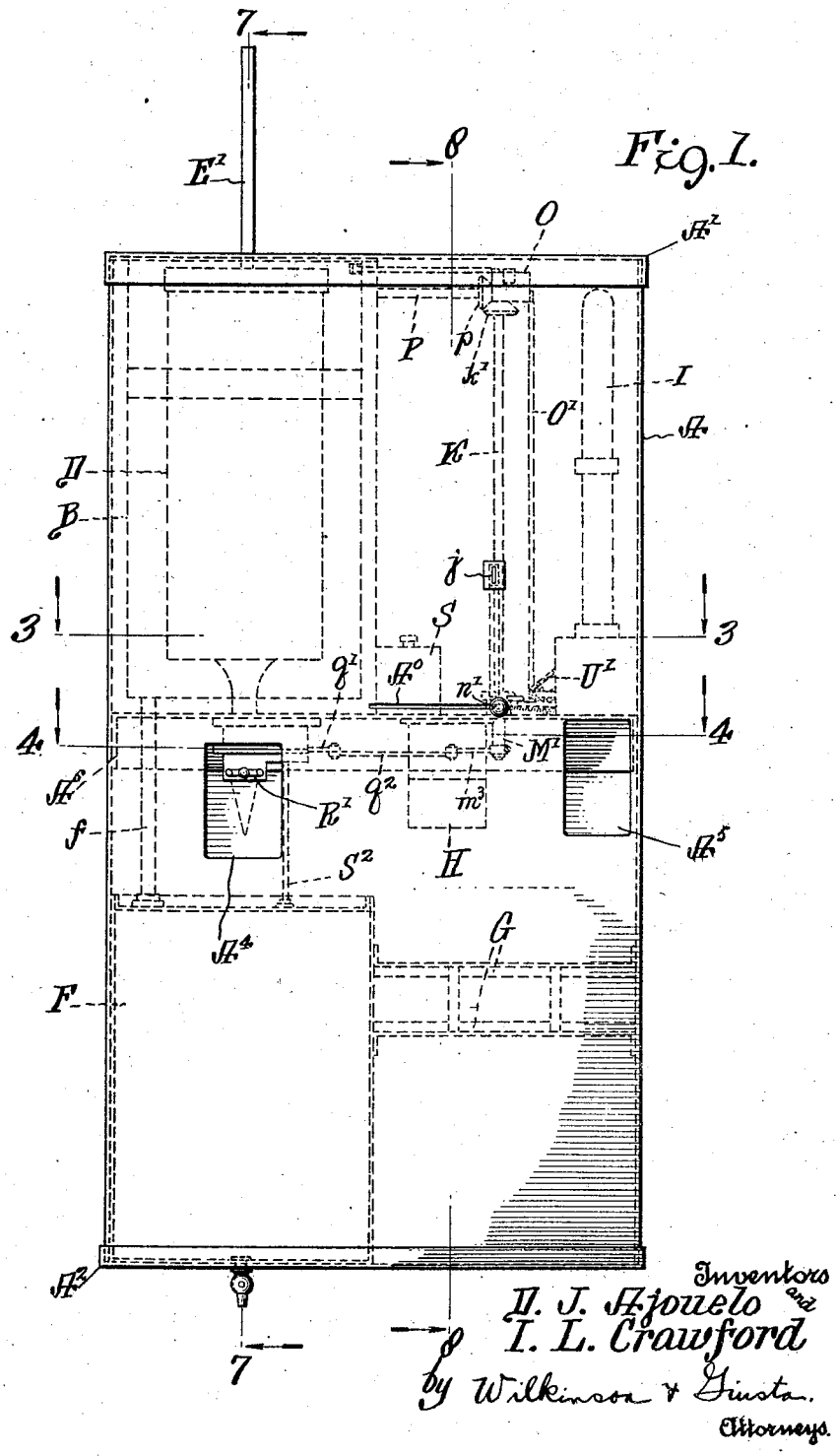

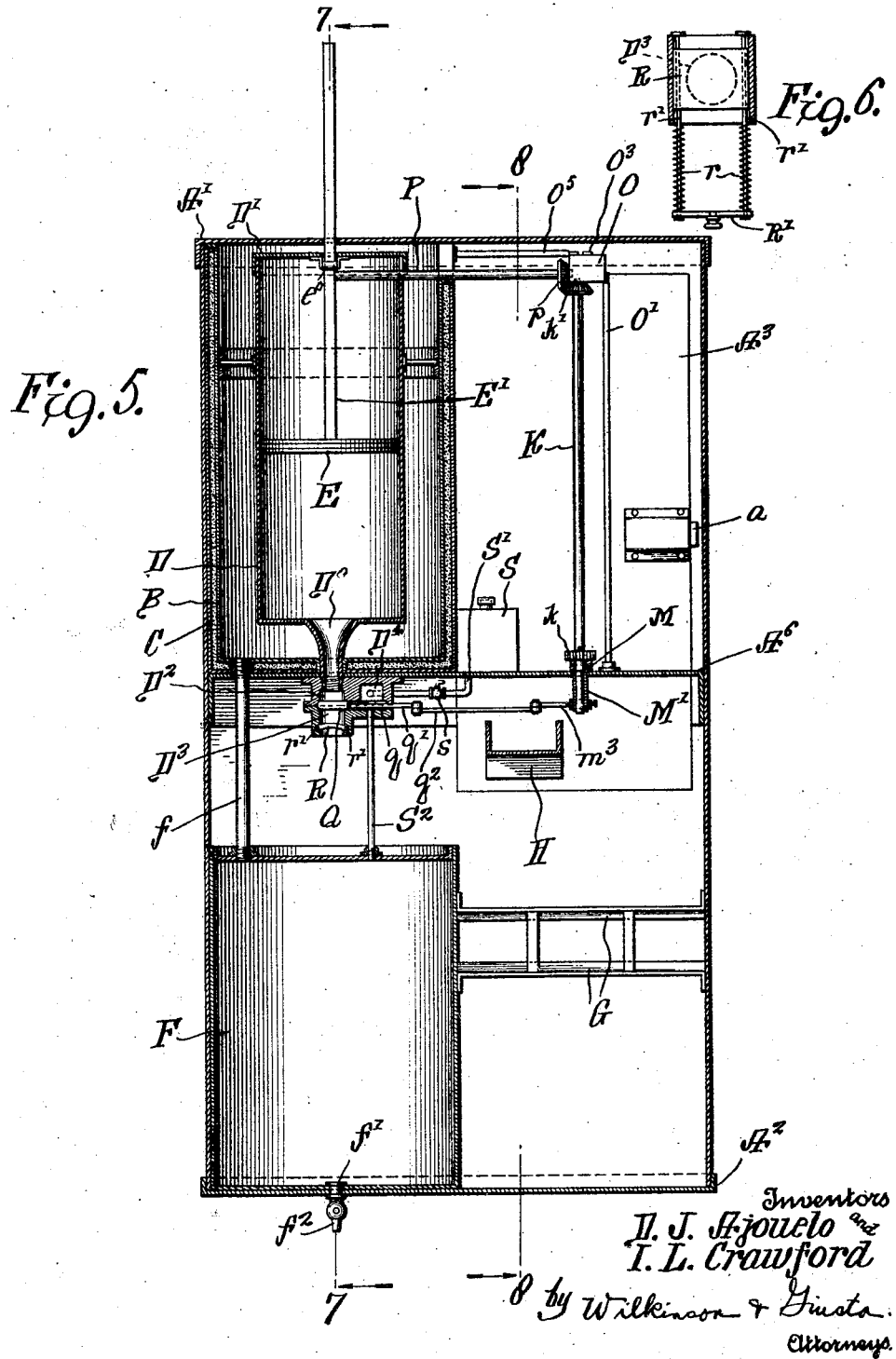

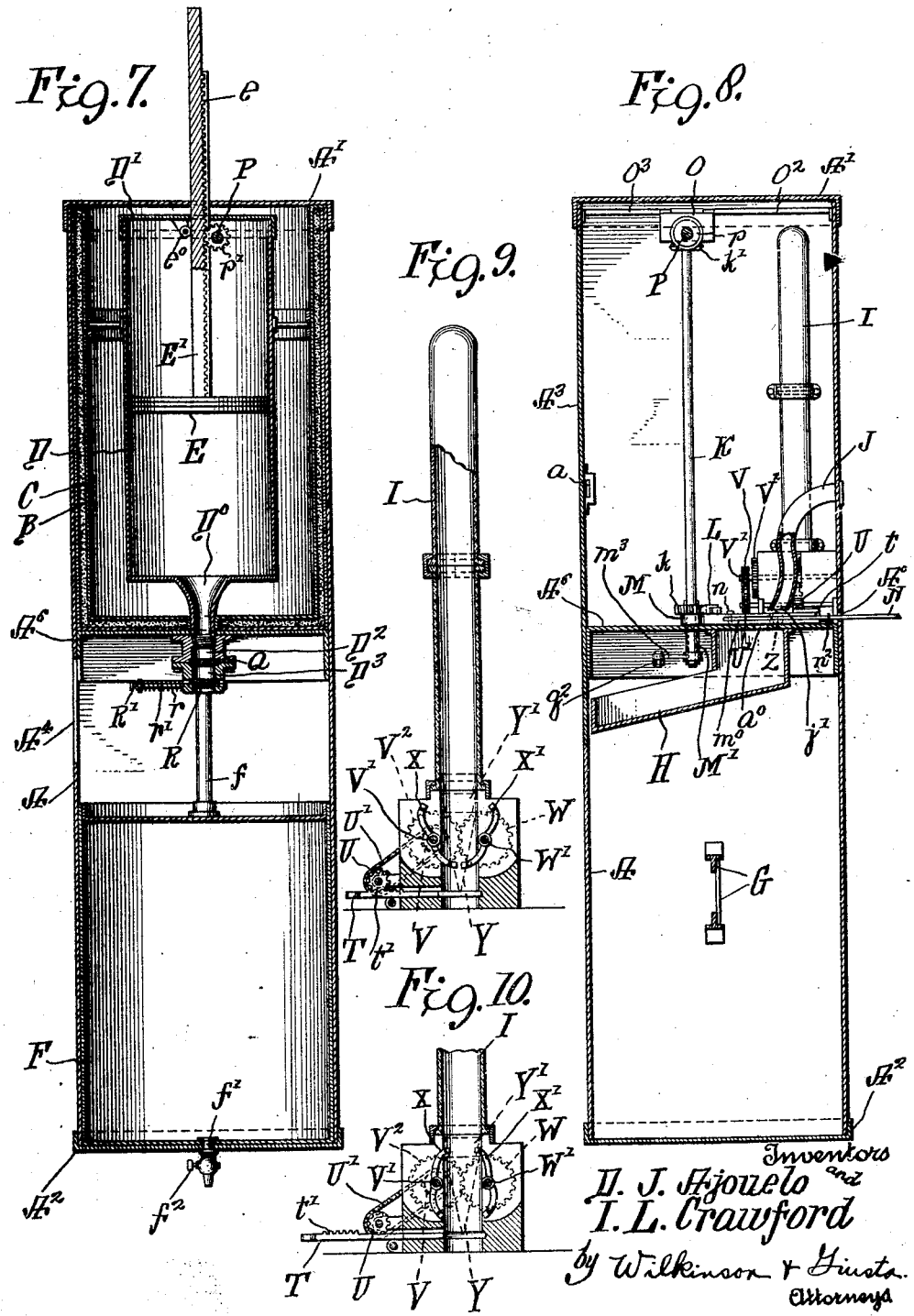

Patented Mar. 16, 1926.

1,577,241

UNITED STATES PATENT OFFICE.

DAVIS JACOB AJOUELO AND IRA LEONARD CRAWFORD, OF ATLANTA, GEORGIA.

ICE-CREAM AND CONE VENDING MACHINE.

Application filed February 11, 1922, Serial No. 535,830. Renewed August 11, 1925.

*To all whom it may concern:*

Be it known that we, DAVIS JACOB AJOUELO and IRA LEONARD CRAWFORD, citizens of the United States, both residing at Atlanta, in the county of Fulton and State of Georgia, have invented certain new and useful Improvements in Ice-Cream and Cone Vending Machines; and we do hereby declare the following to be a full, clear, and exact description of the invention, such as will enable others skilled in the art to which it appertains to make and use the same.

Our invention relates to improvements in coin controlled dispensing apparatus for dispensing ice cream, frozen custard, or similar plastic or liquid material, where it is desired to dispense predetermined quantities of the material at a predetermined price, and to supply same in measured quantities into cones or other suitable receptacles; and where it is desired to keep the parts clean and sanitary without subjecting the containing vessels or the product sold to any handling, or any unnecessary exposure to the air, or to other sources of contamination.

Our invention will be more fully understood after reference to the accompanying drawings, in which like parts are indicated by similar reference symbols throughout the several views, and in which:—

Figure 1 is a side elevation of the container in which the complete apparatus is mounted.

Figure 2 is a plan view of the apparatus showing the casing cover removed.

Figure 3 shows a section along the line 3—3 of Figure 1, and looking in the direction of the arrows.

Figure 4 shows a section along the line 4—4 of Fig. 1; and looking in the direction of the arrows.

Figure 5 shows a vertical section taken along the line 5—5 of Fig. 2, and looking in the direction of the arrows.

Figure 6 is a detail showing the delivery gate or door detached from the apparatus.

Figure 7 shows a vertical section along the line 7—7 of Figs. 1 and 5, and looking in the direction of the arrows.

Figure 8 shows a vertical section along the line 8—8 of Figs. 1 and 5, and looking in the direction of the arrows.

Figure 9 is a sectional elevation showing the cone container and the means for feeding the same seriatim, and shows the dogs in the position for supporting the lowest cone; and Figure 10 is a similar view to Fig. 9, but shows the dogs in the position for releasing the lowest cone.

A represents the casing or container in which the various parts of the apparatus are mounted. This casing is provided with a movable top A' and with a fixed bottom $A^2$ and with a hinged door $A^3$, provided with a suitable lock $a$. The front of the container is provided with a suitable opening $A^4$ to insert the receptacle for the ice cream and to remove the same, and also with another suitable opening $A^5$ to withdraw the container, such as a cone, paper cup or the like, as will be hereinafter described.

The casing is divided by a horizontal partition $A^6$ into an upper and a lower chamber. In the upper chamber we provide an ice tank B, preferably having double walls between which a suitable packing C may be used if desired, or this packing may be omitted and an air space left.

Inside of the ice tank B the ice cream can D is mounted, which is provided with a movable top D' and with an opening $D^0$ in the bottom which supplies the ice cream or other frozen material to the receiving chamber $D^2$, below which is mounted the delivery chamber $D^3$ which will be hereinafter more fully described.

The can D is preferably made of cylindrical shape, and mounted in said can is a piston E adapted to rest on top of the material in the can, and is provided with a piston rod E' having a rack $e$ on one side thereof, which piston rod projects up through the cover D'; and the back of this piston rod may bear against an anti-friction roller $e^0$, as shown in Figure 7.

Mounted in the lower chamber of the casing is the drain tank F which is connected to the ice tank B by means of the drain pipe $f$, and this tank is also provided with a drain pipe $f'$ controlled by a suitable valve $f^2$. This tank F may be steadied in the casing by means of suitable bracing G.

H represents the receptacle to receive the coin which is preferably in the form of a trough, as shown most clearly in Fig. 8, mounted in the lower chamber of the casing beneath the partition $A^6$.

I represents a tube in which the empty cones or cups are mounted. These cones or cups are preferably sanitary and are intended to be used only once, and are delivered from the bottom of said tube, as will be hereinafter described.

The coin conveyor J is provided with a passageway for the coin, having an inlet slot $j$ and an outlet opening $j'$ which delivers the coin to the transporting lever, as will be hereinafter described.

K represents the operating shaft which is intermittently operated by the system of levers M and N. The lever M carries a spring pawl L engaging the ratchet wheel $k$, carried by the shaft K, which will permit the lever M to be swung to the right, see Fig. 3, without turning the shaft K, but will turn said shaft when the lever M is swung to the left as in Fig. 3. This lever M is normally restored to the initial position, shown in Fig. 3, by means of the spring $m$, and the movement of said lever is arrested by a stop $m'$.

N represents the second lever which is pivoted to the first as at $n$, and swings in a slot $m^0$ in the first lever M, as shown in Fig. 8. This second lever N carries at its outer end, for convenience of operation, a ball or handle $n'$, and is normally restored to the initial position by means of the spring $n^2$, see Fig. 3. This lever N projects through a slot $A^0$ in the front of the casing, as shown in Figs. 1 and 8. It will be noted that this lever N will be free to swing to the left (see Fig. 3) relative to the lever M unless it is locked in position by means of the coin which falls from the coin chute into the slot $m^2$ which extends vertically through the lever M, as shown in Fig. 3.

When the coin is dropped into the coin passage it will fall down the same and will engage in the slot $m^2$, and the lower edge of the coin will rest on top of the partition $A^6$, the coin Z then taking the position shown in dotted lines in Fig. 8. This coin will lock the two levers together so that if the operating lever N be swung to the left, when the coin is in place (see Fig. 3), it will carry with it the lever M, and when the coin reaches the opening $a^0$ in the partition $A^6$ it will drop through said opening and fall into the money box H below. This will unlock the lever M from the lever N and there will be an elbow joint formed between the two at the pivot $n$.

When the lever N is released, the two springs $m$ and $n^2$ will bring the two levers M and N back to the initial position shown in Fig. 3. The upper end of the shaft K is journaled in the block O which is connected to the various parts of the casing by means of suitable braces such as $O'$, $O^2$, $O^3$, $O^4$, and $O^5$; and below this bearing block O the shaft K carries a bevel pinion $k'$ which meshes with the bevel pinion $p$ on the shaft P.

The outer end of this shaft P carries a pinion $p'$ which meshes with the rack $e$ on the piston rod $E'$ so that turning the shaft P in the proper direction will cause the piston E to press down on the upper surface of the contents of the can D. By this arrangement the movement of the lever M to the left, as shown in Figs. 2 and 3, will cause direct pressure to be applied to the piston E, tending to force the plastic mass contained in the can D downwards. A similar result might be obtained by the weight of the piston itself and piston rod, or by applying a weight thereto.

Q represents a sliding knife which travels in a guideway $q$, as shown in Fig. 5. This knife is reciprocated through the instrumentality of the lever M which carries a downwardly projecting sleeve $M'$, see Fig. 5, which is loosely mounted on the shaft K. This sleeve carries the crank arm $m^3$ which is connected by the link $q^2$ to the stem $q'$ which is attached to the knife Q. It will be seen that vibrating the lever M will also reciprocate the knife Q.

Mounted below the said knife, and near the lower end of the delivery chamber $D^3$, is the sliding gate R, see Figs. 5, 6 and 7, which normally closes the bottom of the delivery chamber $D^3$, this being held in the closed position by means of the springs $r$ on the rods $r'$, which springs normally press the handle $R'$ outwards, as shown in Figs. 6 and 7. When it is desired to open the bottom of the delivery chamber $D^3$, the handle is pressed inwards, causing the gate R to unmask the opening through the bottom of the chamber $D^3$.

In order to keep the knife clean, and at the same time to prevent it from sticking in the guideway $q$, we provide a water chamber $D^4$, adjacent to the receiving chamber $D^2$, to which water is supplied at normal temperature from the tank S through the pipe $S'$, controlled by the valve $s$. This water after trickling through the guideway $q$ escapes through the drain pipe $S^2$ to the tank F.

In order to provide for the automatic feeding of the receptacles for the ice cream or other material being vended, we provide the feed mechanism shown in Figs. 2, 3 and 8, and more especially in Figs. 9 and 10, in which T represents a rack bar which is connected by the link $t$ to the lever M. This rack bar is provided with the rack teeth $t'$ adapted to intermittently engage the pinion U which drives the sprocket chain $U'$, which drives the pinion V on the shaft $V'$. On this same shaft is a gear $V^2$ meshing with the gear W on the shaft $W'$. These two shafts V' and W' carry double reciprocating arms or dogs X and X' which, when in one position, will normally support the lowest cone Y, see Fig. 9, and when in the other position will support the cone Y' just above the same, see Figs. 9 and 10.

It will be seen that when the lever M is swung to the left it will pull out the rack bar from the position shown in Fig. 9 to the position shown in Fig. 10, shifting the dogs X and X' correspondingly and permitting a single cone to be released from the bottom of the stack. This cone may be either withdrawn by hand or dropped by its own weight.

Instead of a cone it will be obvious that nested stacks of cups may be used, such as the well known paraffined individual cups. With the apparatus of the character described cones will ordinarily be preferable to cups. It will be understood that the receptacles referred to are stacked up in the tube I, to which they may be supplied in any convenient way.

The operation of the device is as follows:—

Suppose the can D to be charged with the plastic article to be dispensed and the washing tank S to be supplied with water, and the parts to be in the position shown in Figs. 1 to 9, a coin of the requisite dimension is inserted in the slot $j$ and, falling down the coin passage J, will pass into the slot $m^2$ in the lever M, and the lower edge of the coin will rest on top of the partition $A^6$, see Figs. 2 and 3. The right face of the coin, as shown in said figures, will lie in the path of the lever N to the left, and thus the coin will lock the two levers together.

Now if the lever N be swung to the left, it will rock with it the lever M and this lever M, through the ratchet and pawl arrangement, will also rock the shaft K. Rocking the shaft K will rotate the shaft P and press down the piston E, thus tending to feed the plastic mass to the receiving chamber $D^2$. Rocking the lever M will also cause the sleeve M' and the crank $m^3$ to withdraw the knife Q and permit the mass to flow from the receiving chamber $D^2$ to the delivery chamber $D^3$, where the amount to be delivered will be measured by the cubical contents of the delivery chamber. In drawing the knife Q to the right, as seen in Figs. 3 and 4, it is drawn through the water which trickles into the guideway $q$ from the water tank S, see Fig. 1, and this water will serve to melt the small amount of ice cream adhering to the said knife, thus not only cleaning the knife but also serving to facilitate the sliding of the knife freely in the guideway $q$.

At the same time that the ice cream is being fed from the can D to the delivery chamber $D^3$, the swinging movement of the lever M will cause the link $t$, see Figs. 2 and 3, to pull on the rack T which will rock the double dogs X and X' from the position shown in Fig. 9 to the position shown in Fig. 10, thereby releasing one of the individual containers which may be withdrawn by hand, or may drop loose and be caught by hand and withdrawn from the opening $A^5$, see Fig. 1.

Now when the lever M approaches its furthest position to the left, under the action of the lever N to which it is locked, the coin Z will be moved to register with the slot $a^0$, see Figs. 2 and 3, and will drop through the said slot $a^0$ into the coin box H, thus breaking the lock between the levers N and M. At this time the spring $m$ will tend to restore the lever M to the initial position, and the lever N will swing freely about its pivot $n$ and the operator will understand that the operation of the machine has been completed. Upon the release of the lever N by the operator it will swing back to the initial position shown in Figs. 2 and 3 under the action of the spring $n^2$.

As the lever M returns to the initial position it will swing the crank $m^3$ back to the position shown in Figs. 3 and 4, thus swinging the knife Q to the closed position and separating the mass contained in the delivery chamber from the superposed mass of plastic matter.

The cycle of operations has now progressed so far that the operator standing in front of the machine will have a receptacle delivered to him through the opening $A^5$, and the delivery chamber $D^3$ will be supplied with the material to be sold. Now the operator inserts the receptacle into the opening $A^4$ beneath the delivery chamber $D^3$ and by pushing on the handle R' the gate R will be moved and the measured contents of the delivery chamber $D^3$ will fall into the receptacle aforesaid.

When the handle R' is released, the springs $r'$ will restore same to the initial position and the cycle or operations will be completed and the parts will be in the position ready for a new cycle. The machine may be operated successively for an indefinite period, or so long as the can D is charged with the plastic material to be sold.

While we have described a machine especially adapted to the sale of ice cream and similar materials, it is obvious that it may be used to dispense various plastic or semi-plastic compositions, or even liquid compositions such, for instance, as sherbets, frozen custards, various syrups, etc. It will be noted that the machine will always supply the same amount of the article to be sold to the delivery chamber which material may be withdrawn therefrom in the special individual packages referred to.

It will be obvious that various modifications might be made in the herein described apparatus, and in the construction, combination and arrangement of parts which could be used without departing from the spirit of our invention; and we do not mean to limit the invention to such details except as particularly pointed out in the claims.

Having thus described our invention what we claim and desire to secure by Letters Patent of the United States is:—

1. Apparatus for vending plastic material comprising a container for the material provided with a delivery chamber located beneath the same and connected thereto, means for simultaneously delivering the material to said delivery chamber and for releasing an individual receptacle for said material, and a hand controlled gate normally closing the bottom of said delivery chamber.

2. Apparatus for vending plastic material comprising a container for the material provided with a delivery chamber located beneath the same and connected thereto, means for simultaneously delivering the material to said delivery chamber and for releasing an individual receptacle for said material, and a spring impressed hand controlled sliding gate normally closing the bottom of said delivery chamber.

3. Apparatus for vending plastic material comprising a container for the material provided with a delivery chamber located beneath the same and connected thereto, a sliding knife normally closing the passage between said container and said delivery chamber, means for removing adhering plastic material from said knife, coin controlled means for simultaneously moving said knife thereby delivering the material to said delivery chamber and for releasing an individual receptacle for said material, and a hand controlled gate normally closing the bottom of said delivery chamber.

4. Apparatus for vending plastic material comprising a container for the material provided with a delivery chamber located beneath the same and connected thereto, a sliding knife normally closing the passage between said container and said delivery chamber, means for supplying a cleansing fluid to said knife to remove adhering plastic material therefrom, coin controlled means for simultaneously moving said knife thereby delivering the material to said delivery chamber and for releasing an individual receptacle for said material, and a spring impressed hand controlled sliding gate normally closing the bottom of said delivery chamber.

5. Apparatus for vending plastic material comprising a cylindrical container for the material provided with a delivery chamber located beneath the same and connected thereto, a piston mounted in said container, a sliding knife mounted above said delivery chamber, and controlling the passage between said container and said delivery chamber, means for supplying a cleansing liquid to said knife to remove adhering plastic material therefrom, a hand controlled gate normally closing the bottom of said delivery chamber, and coin controlled means for simultaneously pressing down on said piston, and withdrawing said knife.

6. Apparatus for vending plastic material comprising a cylindrical container for the material provided with a delivery chamber located beneath the same and connected thereto, a piston mounted in said container, a sliding knife mounted above said delivery chamber, and controlling the passage between said container and said delivery chamber, means for supplying water to said knife to remove adhering plastic material therefrom, a spring impressed hand controlled sliding gate normally closing the bottom of said delivery chamber, and coin controlled means for simultaneously pressing down on said piston, and withdrawing said knife.

7. Apparatus for vending plastic material comprising a holder adapted to contain a series of superposed receptacles, a cylindrical container for the material provided with a delivery chamber located beneath the same and connected thereto, a piston mounted in said container, a sliding knife mounted above said delivery chamber, and controlling the passage between said container and said delivery chamber, a water chamber associated with said knife, means for supplying water to said chamber, and coin controlled means for simultaneously releasing the lower one of said receptacles from said holder, pressing down on said piston, and withdrawing said knife.

8. Apparatus for vending plastic material comprising a holder adapted to contain a series of superposed receptacles, a cylindrical container for the material provided with a delivery chamber located beneath the same and connected thereto, a piston mounted in said container, a sliding knife mounted above said delivery chamber, a cleaning chamber through which said knife passes, means for supplying a cleaning fluid to said chamber, and controlling the passage between said container and said delivery chamber, a hand controlled gate normally closing the bottom of said delivery chamber, and coin controlled means for simultaneously releasing the lower one of said receptacles from said holder, pressing down on said piston, and withdrawing said knife.

9. Apparatus for vending plastic material comprising a holder adapted to contain a series of superposed receptacles, a cylindrical container for the material provided with a delivery chamber located beneath the same and connected thereto, a piston mounted in said container, a sliding knife mounted above said delivery chamber, and controlling the passage between said container and said delivery chamber, a cleaning chamber into which said knife passes, means for supplying water to said chamber, a spring impressed hand controlled sliding gate normally closing the bottom of said delivery chamber, and coin controlled means for simultaneously releasing the lower one of said receptacles from said holder, pressing down on said piston, and withdrawing said knife.

DAVIS JACOB AJOUELO.
IRA LEONARD CRAWFORD.